United States Patent [19]
Bereiter

[11] Patent Number: 5,909,217
[45] Date of Patent: Jun. 1, 1999

[54] LARGE SCALE SYSTEM STATUS MAP

[75] Inventor: Thomas William Bereiter, Austin, Tex.

[73] Assignee: International Business Machines Corporation, Armonk, N.Y.

[21] Appl. No.: 08/940,460

[22] Filed: Sep. 30, 1997

[51] Int. Cl.[6] ....................................... E06F 3/00
[52] U.S. Cl. ........................ 345/357; 345/440; 345/969; 345/356; 395/200.54
[58] Field of Search .................................. 345/329, 349, 345/356, 357, 440, 966, 969; 395/200.53, 200.54

[56] References Cited

U.S. PATENT DOCUMENTS

| | | | |
|---|---|---|---|
| 5,136,690 | 8/1992 | Becker et al. | 345/349 |
| 5,226,120 | 7/1993 | Brown et al. | 395/200.54 |
| 5,261,044 | 11/1993 | Dev et al. | 345/357 |
| 5,270,919 | 12/1993 | Blake et al. | 340/827 |
| 5,276,789 | 1/1994 | Besaw et al. | 345/440 |
| 5,295,244 | 3/1994 | Dev et al. | 345/357 |
| 5,353,399 | 10/1994 | Kuwamoto et al. | 345/349 |
| 5,394,522 | 2/1995 | Sancher-Frank et al. | 345/349 |
| 5,471,399 | 11/1995 | Tanaka et al. | 364/491 |
| 5,479,598 | 12/1995 | Feitelson et al. | 345/340 |
| 5,504,921 | 4/1996 | Dev et al. | 395/200.53 |
| 5,623,590 | 4/1997 | Becker et al. | 345/326 |
| 5,737,553 | 4/1998 | Bartok | 345/339 |
| 5,751,965 | 5/1998 | Mayo et al. | 395/200.54 |
| 5,790,121 | 8/1998 | Sklar et al. | 345/356 |

OTHER PUBLICATIONS

Graphical Methods to Analyze Newwork DAta, Richard A. Becker, Stephen G. Eick, Allan R. Wilks, AT&T bell Laboratories, Naperville, Illinois, USA, 1993 IEEE.

Application of Cognitive Engineering To A Graphics–Based Interface for Effective Network Management Tools, Paul, Reed, Ph.d AT&T Bell Laboratories, p. 2.

*Primary Examiner*—Raymond J. Bayerl
*Assistant Examiner*—X. L. Bautista
*Attorney, Agent, or Firm*—Jeffrey S. LaBaw

[57] ABSTRACT

A large scale system status map is displayed. The map is available to the user at the three different levels of detail. At the top level, the map shows a network of nodes displayed individually as contiguous pixels which are grouped into variable size regions. The regions are in turn grouped into clusters. The clusters are preferably displayed as geographically distinct shapes separated by white space. Each cluster will typically correspond to groups of networks within different buildings. Each cluster contains one or more regions indicated by the line-delimited squares of varying size; the regions will typically correspond to distinct groups of nodes such as node belonging to the same network or subnet.

24 Claims, 5 Drawing Sheets

LARGE SCALE SYSTEM STATUS MAP

BACKGROUND OF THE INVENTION

This invention relates generally to graphical user interfaces. More particularly, it relates to a user interface which displays status information for many systems in a very large computing network.

It is common to couple large numbers of computers into computer networks. With the present evolution of the Internet and intranets, it is apparent that even greater numbers of computers will be coupled to a computer network. Perhaps even now, there are more interconnected computers than standalone systems. The size of these computer networks compounds a number of problems for a network administrator.

One of the problems faced by the network administrator is understanding the status of the various systems in the computer network. Many past efforts for displaying status information present the systems as individual icons interconnected together by lines representing respectively the computer systems and the network. This is generally successful when the network is small. However, this type of graphic display becomes increasingly difficult to present on a single display when the number of systems is large.

The prior art has to some degree dealt with the problem in several ways. Some systems increase the size of the network map so that only a portion of the network map can be seen at a particular time. The system administrator must scroll the map to see all of the network information. An alternate solution is to represent entire regions of the network by a single icon in a top level display. When status details are desired, the system administrator "drills down" to lower level displays which have the status details for individual machines. For example, a network administrator selects an icon representing a particular network, whereupon another panel is presented. Depending on the level of complexity of the network, the panel may have icons representing individual machines or may be an intermediate panel for an intermediate organization level, e.g., group level, so that further selection and panels are needed before the status of individual nodes within the network can be determined.

None of the prior art solutions effectively represent status information for a very complicated large scale distributed computing environment so that a network administrator can readily understand the status of the entire network on a single computer screen. The large map method requires scrolling, and possibly also drill down, to see the needed information if the administrator is interested in an area not currently displayed. Once at an area of interest, the administrator loses the ability to see status of undisplayed areas. The drill down method allows the administrator to see detailed information, but only on a limited part of the network. Neither of these methods gives the administrator a truly global view of the network.

This invention proposes one solution to this problem.

SUMMARY OF THE INVENTION

Therefore, it is an object of the invention to present status information for an entire large scale network to a user on a single screen.

It is another object of the invention to present useful information on a machine by machine basis even at very high levels of the status display.

It is another object of the invention to minimize the amount of manipulation required on the part of the user.

It is another object of the invention to alert the user to important changes of network status for groups of machines in the network.

These and other objects are accomplished by a large scale system status map display. The map is available to the user at three different levels of detail. At the top level, the map shows a network of nodes displayed individually as contiguous pixels which are grouped into variable size regions. The regions are in turn grouped into clusters. The clusters are arranged in the window and preferably displayed as geographically distinct shapes separated by white space.

Each cluster will typically correspond to a particular set of groups of networks, e.g., networks within a given building or campus. Each cluster contains one or more regions indicated by the line-delimited squares of varying size; the regions will typically correspond to distinct groups of nodes such as nodes belonging to the same network or subnet.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
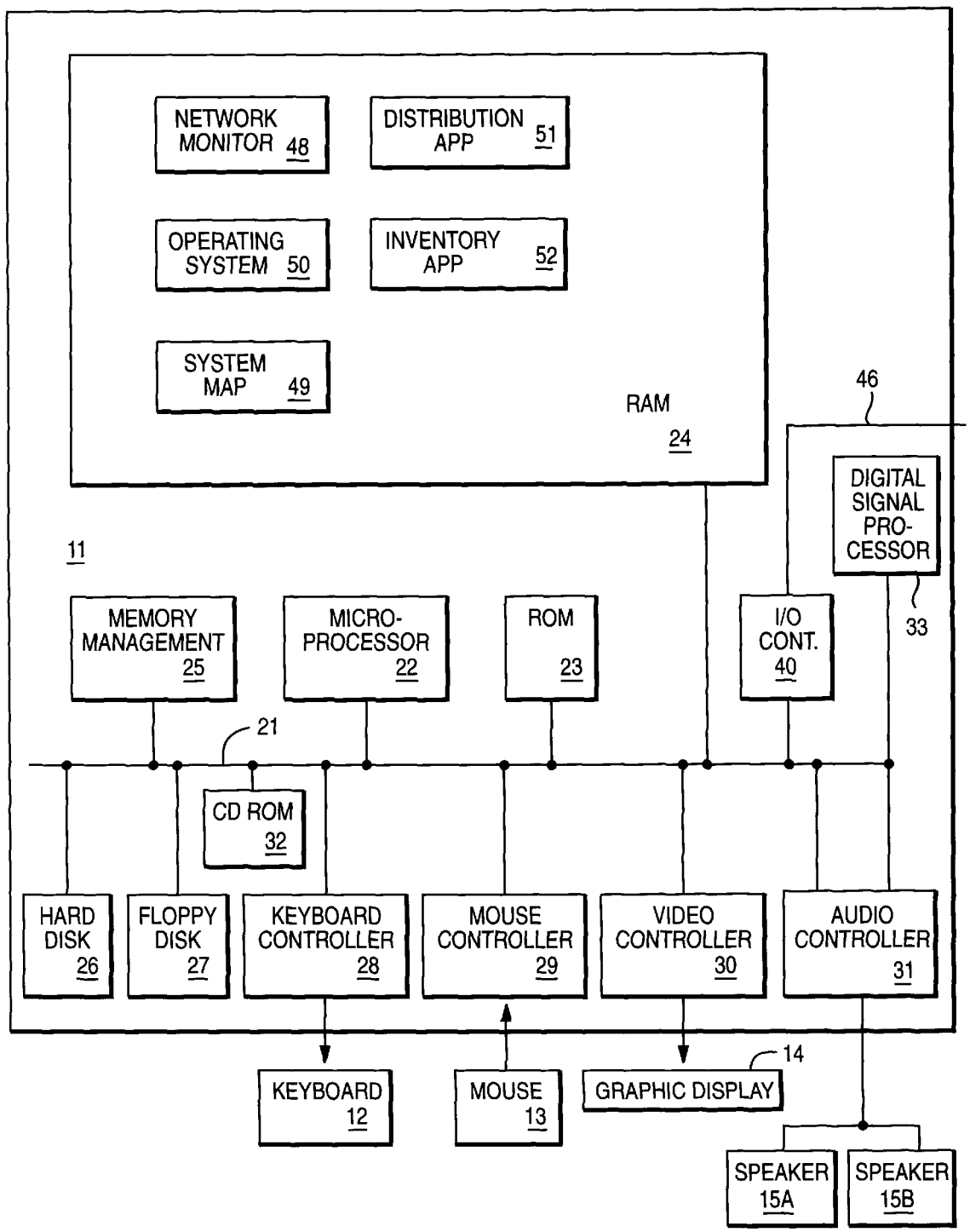
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor with the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the system is responsive to user input, no action by a human operator is desirable in any of the operations described herein which form part of the present invention; the operations are machine operations processing electrical signals to generate other electrical signals.

Figure 2:
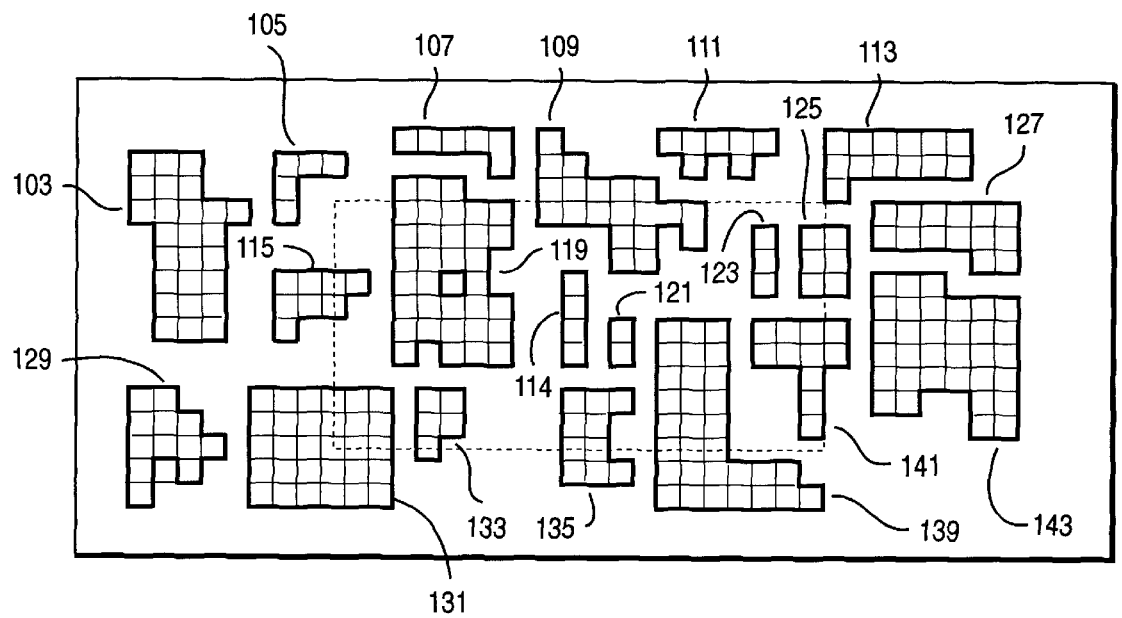
FIG. 2 shows the system status map at the top level where information for all of the systems are displayed in a very large computer network.

The System Status Map 101 as shown in FIG. 2 simultaneously displays information for all systems in a very large computer network. A single small window can contain an abstract view of the entire network. FIG. 2 shows a 16,640 node network displayed within a 300×150 pixel window which is a much larger network than can be displayed by the prior art in a single window. The map 101 is an active display; when the status of a network changes, its status is reflected on the map 101. The map is also a navigational aid; through drag and drop or drill-down operations, the network hierarchy can be quickly traversed.

Figure 3:
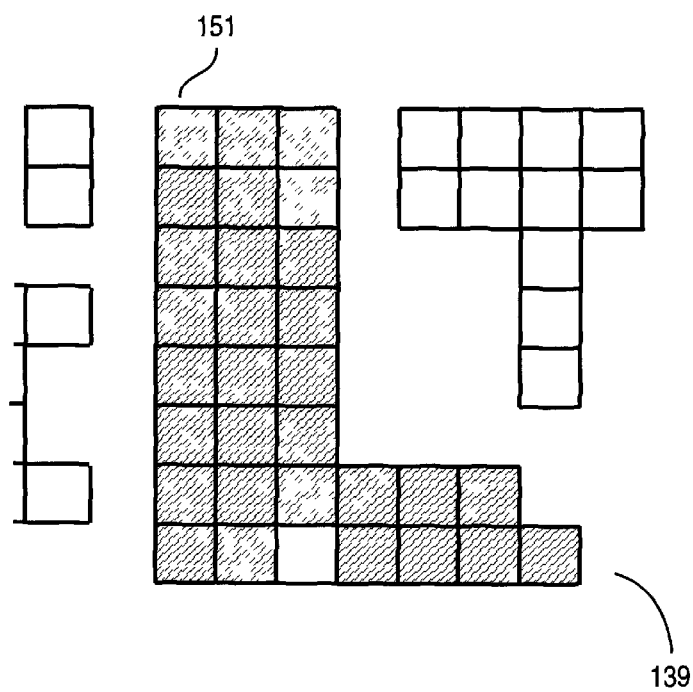
FIG. 3 shows the systems status map at an intermediate level where one cluster has been selected as the focus of the user.
Figure 4:
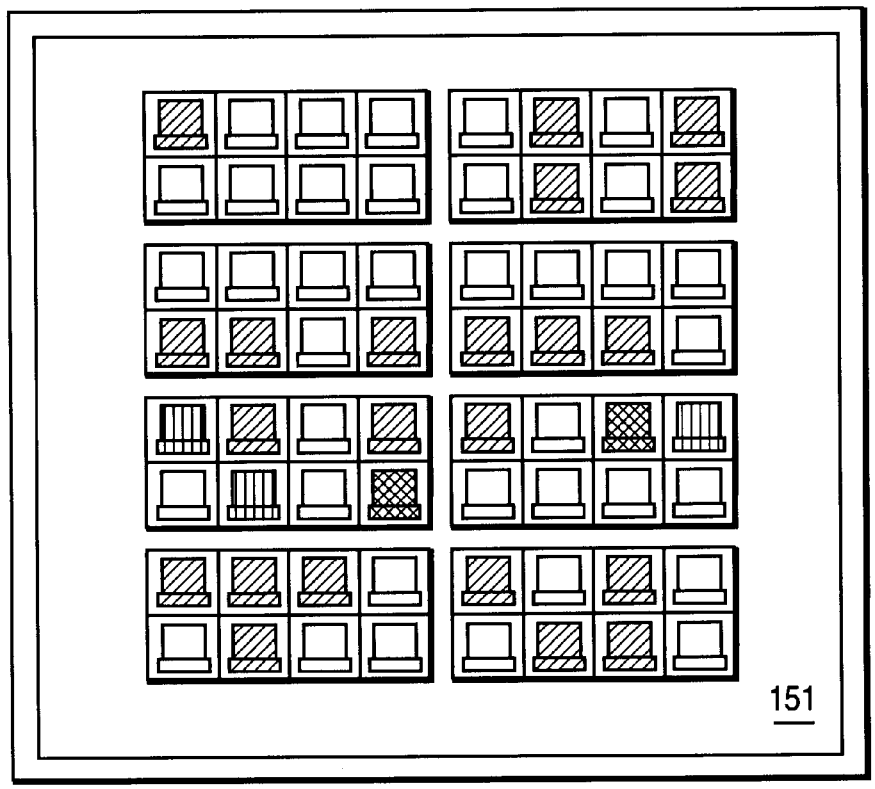
FIG. 4 shows a lower level of the systems status map where a group within a cluster has been chosen as the focus of the user in which individual icons represent individual computer systems.

FIGS. 2, 3 and 4 show the same map at the three different levels of the network hierarchy. At the top level, as shown in FIG. 2, the map shows a network of 16,640 nodes grouped into variable size regions or groups. The regions are in turn grouped into twenty top-level clusters 103–143. As shown, the clusters 103–143 are the geographically distinct shapes separated by white space. In one embodiment, each cluster will typically correspond to groups of networks within different buildings. Each cluster contains one or more groups indicated by the line-delimited squares of varying size; the groups will typically correspond to distinct networks or subnets within the overall large scale network. For example, the second cluster 105 contains five groups 145–153. The individual pixels with a group correspond to the individual nodes on the network.

The size of the cluster and the size of the groups within the cluster are indicative of the total number of individual nodes within the groups and cluster. However, since a range of number of nodes which is placed into a single group shape varies, e.g., a small square might hold between 20 to 100 nodes, a medium square might hold 100 to 300 nodes, clusters of apparently equal size will generally have a somewhat different total number of nodes.

FIG. 3 shows the view resulting by selecting or "drilling-down" to the cluster 139 at the bottom-center of FIG. 2. FIG. 3 is in effect a zoom view of the cluster 139. This view more clearly shows the individual groups 161–201 in the cluster 139. The other clusters are made insensitive to user input, as well as shown in a grayed out or otherwise subdued manner, thus, focusing attention on the desired cluster.

As shown in FIG. 3, a zoom presentation is used, magnifying the entire system status map of FIG. 2 while graying out clusters which have not been selected. The zoom feature may be presented in a window which overlaps the top level presentation. If space allows, a part of the screen which does not overlap the selected cluster in the top level map is selected for the intermediate panel. In an alternate embodiment, the non-selected clusters are not shown in the mid level view; only the selected cluster is displayed. Both alternatives have advantages. In the event that the intermediate level panel shown in FIG. 3 obscures the part of the top level system map in FIG. 2 where the selected cluster is presented, the presence of the grayed-out, non-selected clusters help present the context of the selected cluster. Presenting only the selected cluster conserves display space.

FIG. 4 shows a drill-down panel of the top-left group 151 of the cluster 139 which is invoked when the group 151 is selected from the mid-level pane. In this panel, icons representing individual systems are visible. The attributes of these systems can be directly manipulated with pop-up menus or other controls. Note that the individual icons presenting individual nodes are also colored with the status of the workstation. As the same colors are used in all the levels of the status map, the linkage between pixels in the top level and intermediate level displays and the icons in the lower level display is established in the mind of the user. The lower level of the status map is useful for problem determination, e.g., determining why a given group of nodes does not transition to a 100% ready status. As above, the panel in FIG. 4 may overlap with the panels in FIGS. 2 and 3 on the actual system display.

The system status map compactly and concurrently displays three levels of hierarchy. The levels can be regarded as transparent, allowing details which would ordinarily be presented in lower levels to show through. The pixel display in the top level shows status information of individual workstations which would only be available in the low level panels of the prior art.

In this example, the shapes are randomly placed and constructed. They could have been ordered to resemble an actual building floor plan. For example, pixels and regions representing nodes and groups in lower floors of a building could be placed lower in a cluster, i.e. toward the bottom of the screen, than pixels and regions representing nodes and groups in upper floors of the building. The clusters could be arranged to roughly approximate a city or state geographic outline. Pixels, regions and clusters representing western nodes, groups and clusters would be placed to the left of the status map. The grouping of clusters could also be a logical hierarchy, e.g., division, group, employee rather than a physical network hierarchy.

Other shapes which compactly interlock could be chosen. For instance, hexagons would interlock as easily as the squares shown in the figures. Other shapes such as rectangles could also be easily incorporated in the design of the particular network.

For even more compact views, sub-pixel averaging can be used. This involves representing a group of nodes with a single pixel. The values are averaged or in the case of the population distribution example discussed below, logically ORed, and then displayed as one pixel. Using this technique, a 100,000 node network could be easily displayed in a small window.

Averaging a group of nodes in a single pixel does lose some of the detail of some of the more preferred embodiments of the invention. However, the network administrator is often most interested in the time when all of the nodes within a particular group have reached a predetermined status, e.g., a ready status. This status would indicate that meaningful work in the group could begin. In such a case, while the system status map provides a much more global and particular view of the network than prior art solutions, the importance of representing the status of each particular node at the top level is less than of representing the entire network in a limited workspace. Once a cluster is selected, individual pixels can be assigned to each workstation in the intermediate level view.

The reader should appreciate that the "pixel" assigned to represent a particular workstation is not necessarily, although could be, the same resolution of a "pixel" in the particular display. Indeed, depending on the resolution of the particular display, the system map may need to be altered. In displays of poor resolution or of small size, pixel averaging may be appropriate, in large displays with high resolution, several display pixels may be assigned to each workstation pixel. Finally, the number of display pixels assigned to a workstation pixel will be also a function of the complexity of the network which the system status map represents.

Two examples of applications using the status display are inventory and software distribution.

Figure 5:
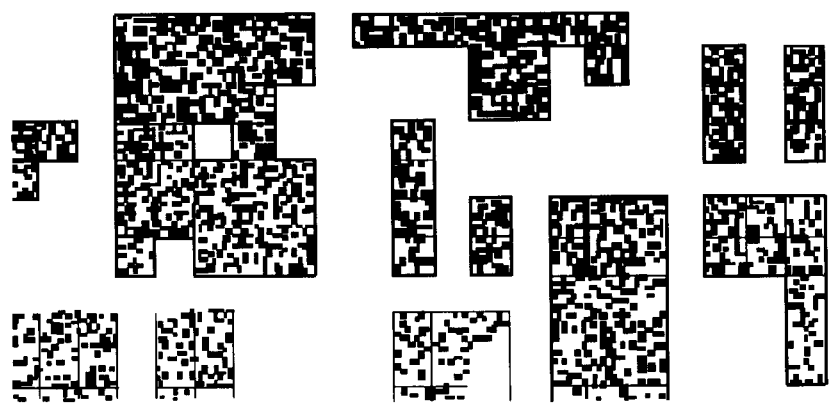
FIG. 5 shows a population distribution presented according to the invention.

The invention might be used to display a population distribution within a network. Consider a query of an inventory database to return the location of all PCs with less than 16 meg of RAM. FIG. 5 shows the result. All matching nodes are indicated with a black pixel. The system map can quickly identify the concentrations of nodes within the network matching the query. Further queries will narrow the matching set. For example, the user can further specify of the PCs with less than 16 meg of RAM (the first query), how many also have a processor running slower than 100 megahertz for a Pentium-level processor. The result would be displayed with the matching nodes indicated by black pixels. Using drill-down, the individual nodes can be examined, e.g., to order the necessary hardware to update the found computers.

The system status map could also show status from a software distribution. At the beginning of the software distribution, all pixels in the map are set to black. As run-time distribution status is received, the pixels are updated to reflect the percentage complete reported by each node. In this example, shades of gray are used. For example, when a node reports that it is ten percent complete with the distribution, its pixel is set to a 10% gray using gray scale. A 10% gray scale value is one that is ten percent of the color distance between black and white. As the software distribution progresses, the visual impression is of a pixel that smoothly increases in intensity.

In most status applications, the transition from 99 to 100 percent is much more significant than the transition from 98 to 99 percent. To reflect this significance, a different color, e.g., blue, is used rather than white to quickly draw the human eye to those nodes that are 100 percent complete. When each node in a group becomes 100 percent complete, the entire group is highlighted in yellow; this saves the human viewer from having to hunt for white or gray pixels within a sea of blue.

Acquiring run-time data from 20,000 nodes is an interesting data acquisition problem in its own right, however, it is outside the scope of this invention. Several techniques known to the prior art can be used.

For example, for distribution status information, a distribution hierarchy is used. The hierarchy defines an inverted tree of common distribution paths with fan-out at each node. To report status, the same hierarchy is used in reverse. Each leaf node reports status to its parent node which coalesces status from all its leaf nodes then reports this combined status to its parent node. Status is preferably concise, e.g., a single byte indicating percentage done, so even in huge networks, the quantity of data is manageable.

When the data acquisition rate is too slow for simultaneous update, an averaging technique is used. Each cluster or each group can be quickly queried to report its range of results. Depending on the application, either the average or the worst case results are used for all nodes. As more complete information arrives, it is used to further refine its area on the map.

Figure 6A:
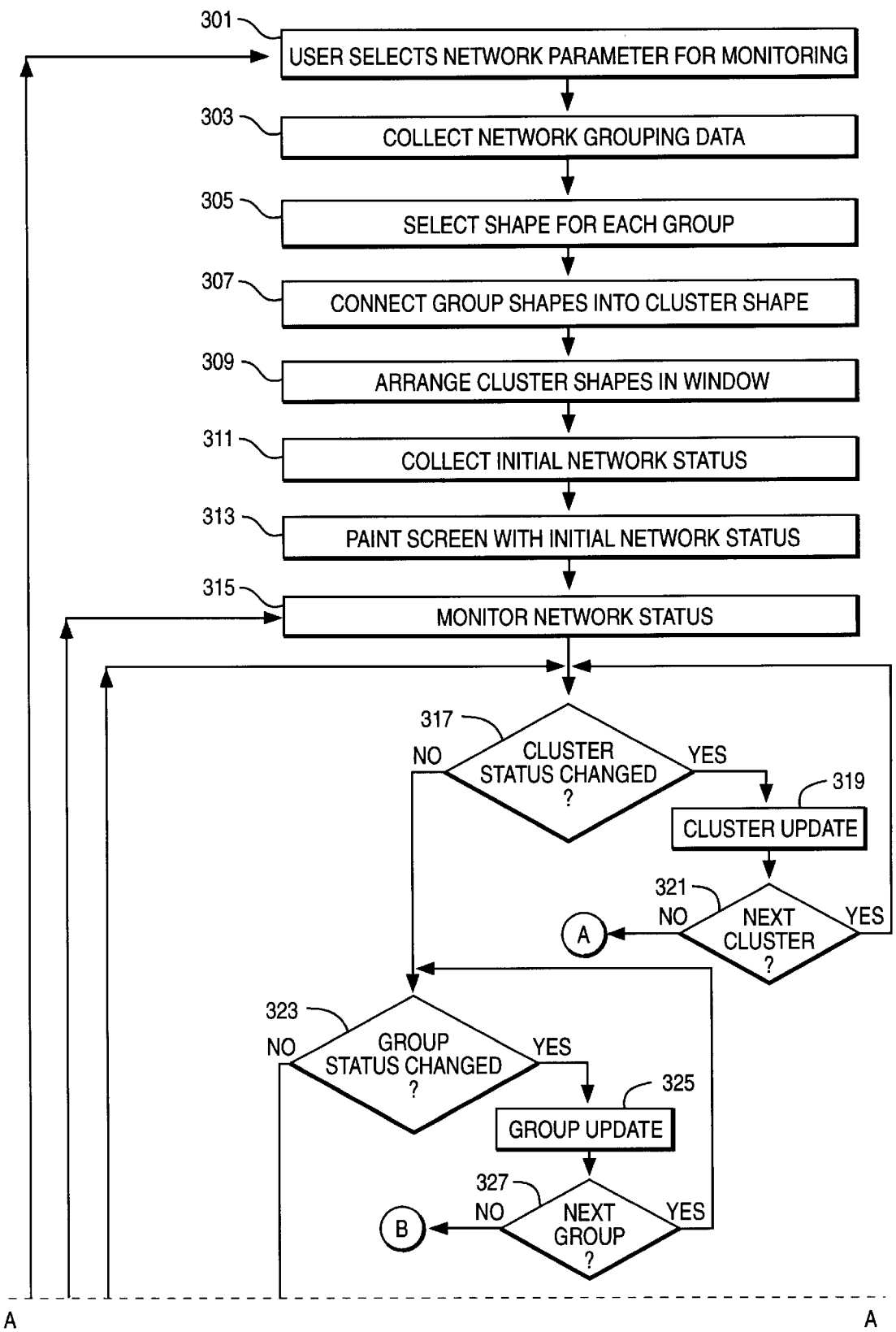
FIG. 6 is a flow diagram for presenting a plurality of network parameters according to the invention.
Figure 6B:
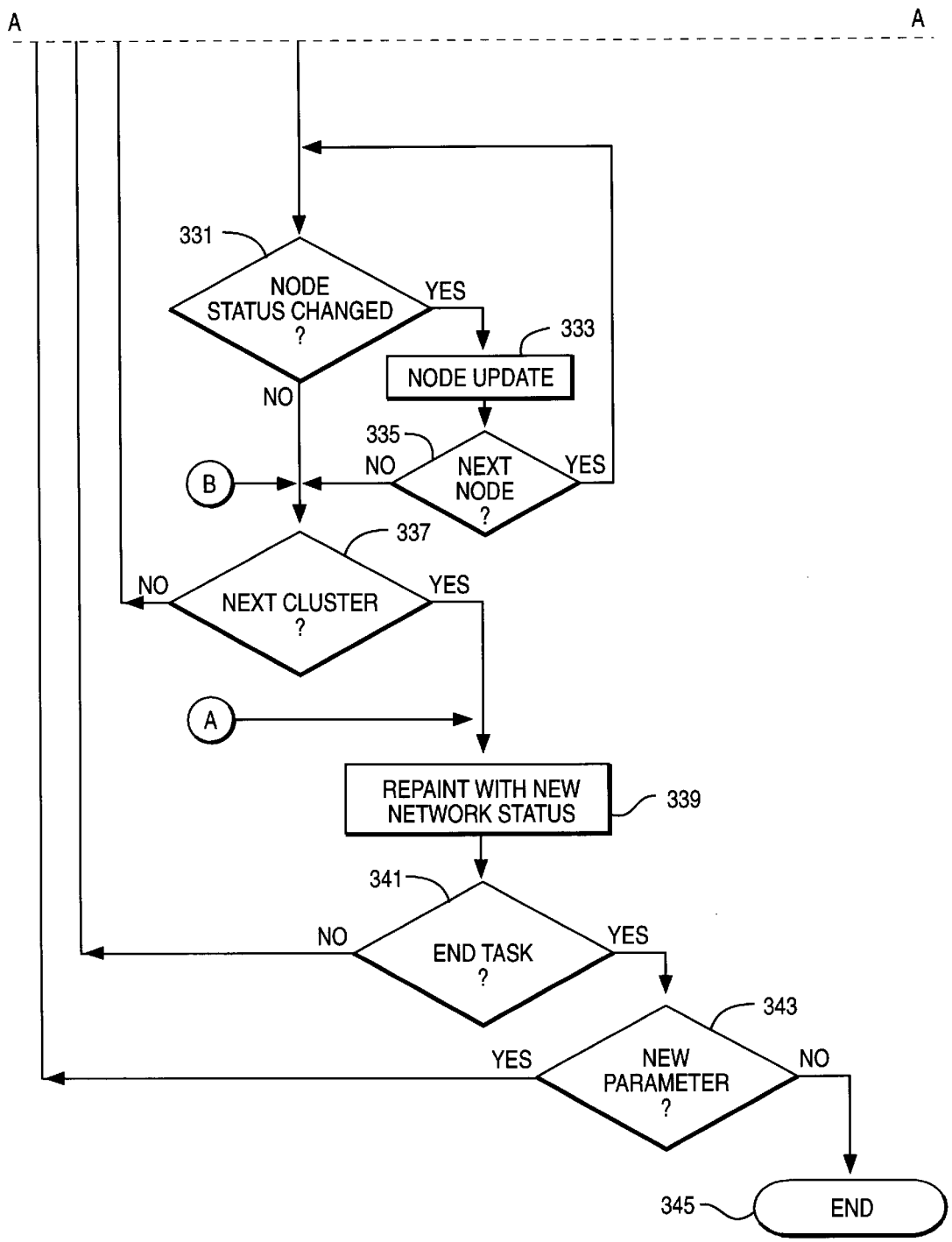

FIG. 6 shows a flow diagram for constructing the large scale system status map. In this example, plurality of network parameters may be chosen for monitoring. In step 301, the user selects the particular network parameter which he wishes to monitor. In response, the system starts setting up the system status map. In step 303, the network grouping data is collected, i.e. which nodes are assigned to which group, which groups are assigned to which cluster and so forth. If there is no stored grouping data, the system can assign groups and clusters based on grouping rules, e.g., follow the network hierarchy or distribution hierarchy. The grouping data or the grouping rules could be different depending on the particular network parameter to be monitored.

In step 305, the shape for each group is selected. It is envisioned that there would be a certain number of shapes which would denote different sized groups within the cluster. For example, a small square might represent 20 to 100 nodes, a medium sized square might represent 101 nodes to 300 nodes, a large square might represent 300 to 1000 nodes, and so forth. Given the size of the group, an appropriate shape would be chosen.

Next, in step 307, the group shapes are connected together to form a cluster shape. While the figures discussed above are random in shape, there may be rules for how the groups are connected to form a cluster. For example, in a cluster which represent the networks in a building, a group representing a first floor network would be at the bottom of the cluster, followed by the group representing the second floor network, followed by the group presenting the third floor nodes and so forth until the group representing the top floor network is placed at the top of the cluster. Other rules such as the place that the groups have within a distribution hierarchy could be used for ordering the group shapes within the cluster shape.

In step 309, the cluster shapes are arranged within the window. Again, in the examples discussed above, the arrangement of the clusters shapes was random. However, there may be rules for arranging the clusters such as geographic location.

Although, this description envisions an automatic method to form and arrange the respective groups and clusters of the systems status map, it is possible that the system status map can be manually produced. In such a case, when the user selects a particular network, the status map would be retrieved for that network with all of the predetermined assignments for nodes, groups and clusters. Once produced by the automatic method, the status map could be stored and reused for a period of time, so long as the network it represents does not change substantially.

In step 311, the initial network status for every node is collected in so far as can be determined. There may be a default status presenting average or worst case information for particular node or group if the information on that node or group cannot be retrieved before the system map is to presented.

In step 313, the large scale system map is presented with the initial network status. The status of each node is checked and represented with the appropriate color, e.g., black, gray, blue or yellow as described above.

Next, the system enters a monitoring phase in step 315. In the flow diagram, the cluster and group status are checked first since if an entire cluster is ready, none of the groups or nodes within that cluster need be checked. In step 317, the cluster status is checked to see if all nodes have reached a 100 percent status. If so, the cluster information is updated in step 319. Step 321 determines whether there is another cluster to check, and if so, returns the process to step 317.

For the unchanged clusters, the ones which have not reached the 100% status, the groups within them are checked. In step 223, the first group status is checked to determine whether it has reached 100% status. If so, the group is updated, step 325. Step 327 determines whether there is another group to check. If so, it returns the process to the step 323. This process is performed for all of the unchanged clusters.

For an unchanged group, the node status is checked in step 331. If the node status is changed, in step 333 the information is updated. Step 335 checks to determine whether there is another node within the group. If so, the process returns to step 331. If not, the process determines in step 337 whether there is another cluster to check. If so, the process returns to process 317 to check the next cluster.

Once all of the network status has been updated, the screen is repainted with the new network status in step 339.

Step 341 tests to determine whether the user has indicated to end monitoring the network for the selected network parameter. If not, the process returns to step 351. If the user has indicated to end monitoring, the system determines whether the user wants to monitor a new network parameter in step 343. If this is the case, the process returns to step 301. If not, in step 343, the process ends.

It is likely that default colors and thresholds for the presentation of the system status map would be generally used. These would be chosen by the GUI designer based on user feedback and requirements from testing of the software. However, in an alternative embodiment, the user may assign the colors to various network status values as well as the thresholds between status values or presentation behaviors. These changes can be effected by a status map properties notebook equipped with the appropriate controls.

The change of an entire region to a new, very different color is very useful to indicate that an entire group has reached a given status. Another technique, blending colors, is useful for the status of a region which is close to reaching the given status, but not there yet. If blue is used to indicate a region has reached a 100% status, a region which reaches an aggregate 90% ready status becomes tinged with the color, e.g., slightly bluish, to indicate that region will soon reach the 100% ready status.

Blending a second color on a region or cluster basis could also be useful for monitoring two network parameters at the same time. The first parameter status would be presented as described above, with individual pixels indicating the status of individual workstations, with the set of colors indicating various states. The second parameter would have its own set of colors distinct from the first set which would be blended into the pixels. To reduce confusion, the second parameter would be calculated as an average across a group or cluster. For example, if the first parameter was displayed in shades of gray, then yellow, then blue, the second parameter could be displayed in shades of red. The pixels in a given region varying in shades of gray would have an blended pink component. The pink component is uniform across the pixels in the region and would intensify as the second parameter reached a given status. Thus, the system status map could be used as a way of compactly displaying network status for two parameters in a large network.

In an alternative embodiment, the invention can be expanded to allow the selection of multiple clusters for simultaneous review of several areas of the network. Each selected cluster would have its own intermediate map; further selection within the respective clusters would result in several lower level panels. This feature is useful in detecting whether there is a common element in network hangs at different locations.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for displaying status for a very large computer network, comprising the steps of:
   collecting status data for a plurality of nodes in the network for a first network parameter;
   presenting the status data on a computer display in a top level window, wherein each node is represented in the display by a respective pixel and a color chosen for each respective pixel is indicative of the status data for the network parameter for the respective node, and wherein each respective pixel is grouped into a group of contiguous pixels of a plurality of similar groups according to a hierarchy to which the nodes belong.

2. The method as recited in claim 1 wherein each group within the plurality of groups represents a network and a shape and a size of the group indicates a number of nodes in the network.

3. The method as recited in claim 2 wherein the plurality of groups are connected into a plurality of clusters, each cluster representing a set of networks which share a network characteristic.

4. The method as recited in claim 3 wherein the network criteria is geographic location.

5. The method as recited in claim 1 further comprising the steps of:
   monitoring the network for changes in the status information for the plurality of nodes; and
   changing the colors used for respective pixels to indicate changes in the status data for respective nodes.

6. The method as recited in claim 5, wherein one set of similar colors is used to display values of the network parameter in a first range, and wherein at least one color different from the set of similar colors is used to display a value of the network parameter which is outside the first range.

7. The method as recited in claim 2 further comprising the steps of:
   monitoring the network for changes in the status information in the plurality of nodes;
   determining whether all the nodes in a respective group have reached a predetermined status for the network parameter; and
   displaying all of the pixels assigned to nodes in the group in a new color, indicating that all the nodes in the group have reached the predetermined status.

8. The method as recited in claim 7 further comprising the steps of:
   determining whether all the groups in a respective cluster have reached the predetermined status for the network parameter; and
   displaying all of the pixels assigned to nodes in the cluster in a new color, indicating that all the nodes in the cluster have reached the predetermined status.

9. The method as recited in claim 8 further comprising the step of responsive to the selection of a cluster, presenting a mid level window containing an enlarged view of the selected cluster.

10. The method as recited in claim 9 further comparing the step of responsive to the selection of a group within the selected cluster, presenting a lower level window for the selected group wherein individual nodes are represented by icons whose colors are identical to the status colors of the top level and the mid level windows of corresponding pixels.

11. A method for displaying status for a very large network comprising the steps of:
    presenting a first view of the network representing groupings of nodes, wherein a cluster of nodes which share a common value for a first characteristic are displayed in a first area of the display and groups of nodes within the cluster of nodes which share a respective common value for a second characteristic are displayed in respective areas within the first area and individual nodes are represented within respective areas by respective pixels each colored according to a status value for the node;
    responsive to a selection of a cluster of nodes, presenting an enlarged view of the selected cluster of nodes; and
    responsive to a selection of a group of nodes within the selected cluster of nodes, presenting an icon view of the selected group of nodes where each individual node is represented by a colored icon colored according to the status value for the node.

12. A method for displaying status for a very large network comprising the steps of:
    collecting network grouping data which organizes nodes into groups and groups into clusters according to shared characteristics of members of the respective groups and clusters;
    selecting a shape for each group indicating how many nodes are members of the respective group;
    forming a cluster shape from the group shapes for each cluster according to the groups which are members of the respective cluster;
    collecting network status information for the nodes in the network;
    selecting a color for each pixel for each node according to the collected network status;
    presenting a network status map.

13. The method as recited in claim 12 further comprising the step of arranging the cluster shapes on the display according to a cluster rule.

14. The method as recited in claim 13 further comprising the step of arranging the group shapes in the cluster shape according to a grouping rule.

15. The method as recited in claim 12 further comprising the steps of:
    monitoring the network status;
    detecting changes in network status; and
    updating the colors of respective pixels according to changes in network status.

16. A system for displaying status for a very large network, including processor, memory, input devices and display, comprising:
    means for collecting network status information for a plurality of nodes in the network;
    means for selecting a color for each pixel for each node according to the collected network status; and
    means for presenting the status data on the display in a top level map, wherein each node is represented in the display by a respective pixel, and wherein each respective pixel is grouped into a group of contiguous pixels of a plurality of similar groups according to a hierarchy to which the nodes belong.

17. The system as recited in claim 16 further comprising:
    means for collecting network grouping data which organizes nodes into groups and groups into clusters according to shared characteristics of members of the respective groups and clusters;
    means for selecting a shape for each group indicating how many nodes are members of the respective group;
    means for forming a cluster shape from the group shapes for each cluster according to the groups which are members of the respective cluster; and means for arranging the cluster shapes into the top level map.

18. The system as recited in claim 17 wherein the cluster shapes are arranged on the display according to a cluster rule.

19. The system as recited in claim 17 wherein the group shapes are arranged in the cluster shape according to a grouping rule.

20. The system as recited in claim 17 further comprising:

means for monitoring the network status;

means for detecting changes in network status; and means for updating the colors of respective pixels according to changes in network status.

21. A computer program product in a computer readable medium for displaying status for a very large network, comprising:

means for collecting network status information on a first network parameter for a plurality of nodes in the network;

means for selecting a color from a first set of colors for each pixel for each node according to the collected network status; and means for presenting the status data on the display in a top level map, wherein each node is represented in the display by a respective pixel, and wherein each respective pixel is grouped into a group of contiguous pixels of a plurality of similar groups according to a hierarchy to which the nodes belong.

22. The product as recited in claim 21 further comprising:

means for collecting network status information on a second network parameter for a plurality of nodes in the network;

means for selecting a color from a second set of colors for each group of nodes according to the collected network status for the second network parameter; and means for presenting the status data on the display in the top level map, wherein the selected color for each group is blended into the selected color for each node.

23. The product as recited in claim 21 wherein the nodes in each group within the plurality of groups share a first network characteristic and a shape and a size of the group indicates a number of nodes in the group.

24. The product as recited in claim 23 wherein the plurality of groups are connected into a plurality of clusters, each cluster representing a set of networks which share a second network characteristic.

* * * * *